(12) United States Patent
He et al.

(10) Patent No.: US 12,554,456 B2
(45) Date of Patent: Feb. 17, 2026

(54) INTER-DEVICE COMMUNICATION METHOD, CAMERA, AND DISPLAY

(71) Applicants: Beijing BOE Optoelectronics Technology Co., Ltd., Beijing (CN); BOE Technology Group Co., Ltd., Beijing (CN)

(72) Inventors: Huidong He, Beijing (CN); Peng Han, Beijing (CN); Qianwen Jiang, Beijing (CN); Juanjuan Shi, Beijing (CN); Weihua Du, Beijing (CN); Xue Dong, Beijing (CN); Hao Zhang, Beijing (CN); Lili Chen, Beijing (CN); Yongzhong Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 63 days.

(21) Appl. No.: 18/562,346

(22) PCT Filed: May 26, 2021

(86) PCT No.: PCT/CN2021/096131
§ 371 (c)(1),
(2) Date: Nov. 20, 2023

(87) PCT Pub. No.: WO2022/246704
PCT Pub. Date: Dec. 1, 2022

(65) Prior Publication Data
US 2024/0248672 A1 Jul. 25, 2024

(51) Int. Cl.
G06F 3/147 (2006.01)
H04N 23/66 (2023.01)
H04N 23/80 (2023.01)

(52) U.S. Cl.
CPC ............. *G06F 3/147* (2013.01); *H04N 23/66* (2023.01); *H04N 23/80* (2023.01)

(58) Field of Classification Search
CPC ........ G06F 3/147; H04N 23/66; H04N 23/80; H04N 23/60
See application file for complete search history.

(56) References Cited

U.S. PATENT DOCUMENTS

2005/0280720 A1* 12/2005 Kwon ................ H04N 1/32128
348/231.3
2010/0171826 A1* 7/2010 Hamilton ............... H04N 7/188
348/135

(Continued)

FOREIGN PATENT DOCUMENTS

CN 1708084 A 12/2005
CN 105679064 A 6/2016

(Continued)

OTHER PUBLICATIONS

International Search Report for PCT/CN2021/096131 Mailed Feb. 17, 2022.

(Continued)

*Primary Examiner* — Hung H Lam
(74) *Attorney, Agent, or Firm* — Ling Wu; Stephen Yang; Ling and Yang Intellectual Property

(57) ABSTRACT

The present application discloses an inter-device communication method, a camera, and a display, for use in providing a method for direct communication between a camera and a display. The camera comprises a controller, a camera body, a memory, and a communication module. The controller is configured to perform the following steps: acquiring an image from the camera body and performing image processing on the image to determine configuration information of the image; determining ID code information of the image according to identification information of the camera body (Continued)

and the configuration information, wherein the ID code information is used for representing the identification information of the camera body and the configuration information of the image; and sending the image and the ID code information to a display, so that the display performs image processing on the image according to the ID code information and then displays the image.

18 Claims, 9 Drawing Sheets

(56) References Cited

U.S. PATENT DOCUMENTS

2012/0244891 A1* 9/2012 Appleton .......... H04M 3/42102
455/466

2015/0026633 A1* 1/2015 Sugimoto ............. G06F 3/0482
715/778
2015/0033193 A1* 1/2015 Beaurepaire .......... G06F 3/0487
715/863
2020/0404154 A1 12/2020 Cen et al.

FOREIGN PATENT DOCUMENTS

| CN | 110291774 A | 9/2019 |
| CN | 110875944 A | 3/2020 |
| CN | 210201973 U | 3/2020 |
| CN | 111950374 A | 11/2020 |

OTHER PUBLICATIONS

Office Action dated Oct. 12, 2025 for CN 202180001281.0 and English Translation.

* cited by examiner

INTER-DEVICE COMMUNICATION METHOD, CAMERA, AND DISPLAY

CROSS-REFERENCE TO RELATED APPLICATION

The present application is a U.S. National Phase Entry of International Application No. PCT/CN2021/096131 having an international filing date of May 26, 2021. The entire contents of the above-identified application are hereby incorporated by reference.

TECHNICAL FIELD

The present disclosure relates to the technical field of Internet of Things communication, in particular to an inter-device communication method, a camera, and a display.

BACKGROUND

Internet of Things (IOT) refers to real-time collection of any object or process that needs monitoring, connection, and interaction through various apparatuses and technologies such as various information sensors, radio frequency identification technologies, global positioning systems, infrared sensors, and laser scanners, and collection of various required information such as sound, light, heat, electricity, mechanics, chemistry, biology, and location thereof. Through all kinds of network access, ubiquitous connections between things and things and between things and people are achieved, and intelligent perception, identification, and management of things and processes are achieved.

At present, display devices in the Internet of Things are all working with all peripherals driven through an Application Processor (AP) motherboard, that is, data processing is carried out through a Central Processing Unit (CPU) on a motherboard, to achieve functions such as display of a Liquid Crystal Display (LCD) and taking pictures by a camera. At present, products on the market are all connected with a LCD and a Camera on an AP motherboard, so image processing of the LCD and the Camera is completed by a CPU and a Graphics Processing Unit (GPU) on the AP motherboard, which greatly increases power consumption of the motherboard and reduces service life of a display device, and hardware architecture and data communication are relatively complicated.

SUMMARY

In a first aspect, an embodiment of the present disclosure provides an inter-device communication method, which is applied to a camera, wherein the method includes: acquiring an image of a camera body of the camera and performing image processing on the image to determine configuration information of the image; determining Identity (ID) code information of the image by using a controller of the camera according to identification information of the camera body and the configuration information, wherein the ID code information is used for representing the identification information of the camera body and the configuration information of the image; and sending the image and the ID code information to the display to enable the display to display the image after performing image processing on the image according to the ID code information.

In some examples, further including: in response to an operation instruction for the image, updating the image and the ID code information of the image according to an image operation corresponding to the operation instruction; and sending an updated image and ID code information to the display to enable the display to update the image.

In some examples, the sending the image and the ID code information to the display, further includes: sending a stored display identification code to the display, to enable the display to perform identity verification according to the received display identification code before displaying the image according to the ID code information, and establish a communication connection with the camera after the identity verification is passed, wherein the display identification code is acquired from at least one display bonded with the camera.

In some examples, the camera is determined to be bonded with the display by: acquiring a display identification code of the display, and establishing a correspondence between the display identification code and a camera identification code of the camera to bond the display; and sending the camera identification code to the display to enable the display to establish a correspondence between the display identification code and the camera identification code.

In some examples, the sending the stored display identification code to the display, includes: in response to a designated signaling for the display, sending a stored display identification code of the display corresponding to the designated signaling to the display.

In some examples, further including: receiving ID code information sent by the display; and updating the configuration information of the image according to the ID code information.

In some examples, the receiving the ID code information sent by the display, further includes: receiving a camera identification code sent by the display; and before updating the configuration information of the image according to the ID code information, verifying whether the received camera identification code is consistent with its own camera identification code, and if so, sending an identity verification passing message to the display, and establishing a communication connection with the display.

In some examples, the ID code information is determined by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

In a second aspect, an embodiment of the present disclosure provides an inter-device communication method, which is applied to a display, and the method includes: receiving an image and ID code information sent by a camera, wherein the ID code information is used for representing identification information of the camera and configuration information of the image; and displaying the image after performing processing on the image according to the ID code information.

In some examples, the receiving the image and the ID code information sent by the camera, further includes: receiving a display identification code sent by the camera; and performing identity verification according to the received display identification code before displaying the image according to the ID code information, and establishing a communication connection with the camera after it is confirmed that the identity verification is passed, wherein the display identification code is a display identification code in at least one display bonded with the camera.

In some examples, the display is determined to be bonded with the camera by: receiving a camera identification code sent by the camera, and establishing a correspondence between the display identification code and the camera identification code to bond the camera.

In some examples, further including: in response to a display operation instruction for an image, updating the ID code information according to a display operation corresponding to the display operation instruction; and sending updated ID code information to the camera to enable the camera to update the configuration information of the image according to the updated ID code information.

In some examples, the sending the ID code information to the camera, further includes: sending a stored camera identification code to the camera, to enable the camera to perform identity verification according to the received camera identification code before updating the configuration information of the image, and establish a communication connection with the display after the identity verification is passed.

In some examples, the sending the stored camera identification code to the camera, includes: in response to a designated signaling for the camera, sending a stored camera identification code of the camera corresponding to the designated signaling to the display.

In some examples, the ID code information is determined by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

In a third aspect, an embodiment of the present disclosure also provides a camera including a controller, a camera body, a memory, and a communication module, wherein: the camera body is configured to perform acquisition of an image; the memory is configured to perform storing the image and ID code information; the communication module is configured to perform establishing a communication connection with a display and perform communication; the controller is configured to perform following acts: acquiring an image from the camera body and performing image processing on the image to determine configuration information of the image; determining ID code information of the image according to identification information of the camera body and the configuration information, wherein the ID code information is used for representing the identification information of the camera body and the configuration information of the image; and sending the image and the ID code information to the display to enable the display to display the image after performing image processing on the image according to the ID code information.

In some examples, the controller is specifically further configured to perform: in response to an operation instruction for the image, updating the image and the ID code information of the image according to an image operation corresponding to the operation instruction; and sending an updated image and ID code information to the display to enable the display to update the image.

In some examples, the controller is specifically further configured to perform: sending a stored display identification code to the display, to enable the display to perform identity verification according to the received display identification code before displaying the image according to the ID code information, and establish a communication connection with the camera after the identity verification is passed, wherein the display identification code is acquired from at least one display bonded with the camera.

In some examples, the controller is specifically configured to determine that the camera is bonded with the display by: acquiring a display identification code of the display, and establishing a correspondence between the display identification code and a camera identification code of the camera to bond the display; and sending the camera identification code to the display to enable the display to establish a correspondence between the display identification code and the camera identification code.

In some examples, the controller is specifically configured to perform: in response to a designated signaling for the display, sending a stored display identification code of the display corresponding to the designated signaling to the display.

In some examples, the controller is specifically further configured to perform: receiving ID code information sent by the display; and updating the configuration information of the image according to the ID code information.

In some examples, the controller is specifically further configured to perform: receiving a camera identification code sent by the display; and before updating the configuration information of the image according to the ID code information, verifying whether the received camera identification code is consistent with its own camera identification code, and if so, sending an identity verification passing message to the display, and establishing a communication connection with the display.

In some examples, the controller is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

In a fourth aspect, an embodiment of the present disclosure also provides a display including a controller, a display panel, a memory, and a communication module, wherein: the display panel is configured to perform displaying of an image; the memory is configured to perform storing the image and ID code information; the communication module is configured to perform establishing a communication connection with a camera and perform communication; the controller is configured to perform following acts: receiving an image and ID code information sent by the camera, wherein the ID code information is used for representing identification information of a camera body of the camera and configuration information of the image; and displaying the image after performing processing on the image according to the ID code information.

In some examples, the controller is specifically further configured to perform: receiving a display identification code sent by the camera; and performing identity verification according to the received display identification code before displaying the image according to the ID code information, and establishing a communication connection with the camera after it is confirmed that the identity verification is passed, wherein the display identification code is a display identification code in at least one display bonded with the camera.

In some examples, the controller is specifically configured to determine that the display is bonded with the camera by: receiving a camera identification code sent by the camera, and establishing a correspondence between the display identification code and the camera identification code to bond the camera.

In some examples, the controller is specifically further configured to perform: in response to a display operation instruction for an image, updating the ID code information according to a display operation corresponding to the display operation instruction; and sending updated ID code information to the camera to enable the camera to update the configuration information of the image according to the updated ID code information.

In some examples, the controller is specifically further configured to perform: sending a stored camera identification code to the camera, to enable the camera to perform identity verification according to the received camera identification code before updating the configuration information of the image, and establish a communication connection with the display after the identity verification is passed.

In some examples, the controller is specifically configured to perform: in response to a designated signaling for the camera, sending a stored camera identification code of the camera corresponding to the designated signaling to the display.

In some examples, the controller is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

In a fifth aspect, an embodiment of the present disclosure also provides a computer storage medium on which a computer program is stored, wherein when the program is executed by a controller, the program is used for implementing acts of the method described in the first aspect or the second aspect.

These aspects or other aspects of the present disclosure will be more concise and easy to understand in following description of embodiments.

BRIEF DESCRIPTION OF DRAWINGS

In order to more clearly illustrate technical solutions in the embodiments of the present disclosure, following is brief description of accompanying drawings that need to be used in the description of the embodiments. It will be apparent that the accompanying drawings in the following description are only some embodiments of the present disclosure, for those of ordinary skill in the art, other accompanying drawings may be obtained from these accompanying drawings, without creative labor.

DETAILED DESCRIPTION

Figure 1:
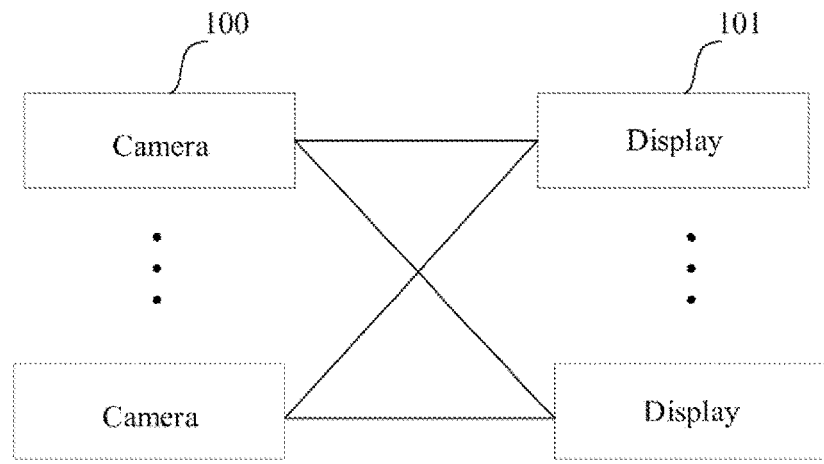
FIG. 1 is a schematic diagram of an inter-device communication system according to an embodiment of the present disclosure.

In order to make the object, technical solutions, and advantages of the present disclosure clearer, the present disclosure will be described in further detail below in conjunction with the accompanying drawings, and it is apparent that the described embodiments are only a part of the embodiments of the present disclosure, not all embodiments of the present disclosure. Based on the embodiments of the present disclosure, all other embodiments obtained by a person of ordinary skill in the art without creative labor belong to the scope of protection of the present disclosure.

A term "and/or" in the embodiments of the present disclosure describes a relationship of related objects, indicating that there may be three kinds of relationships, for example, A and/or B, which may indicate: A exists alone, A and B exist at the same time, and B exists alone. A character "/" generally indicates an "or" relationship between context associated objects.

An application scenario described in the embodiments of the present disclosure is intended to more clearly explain the technical solutions of embodiments of the present disclosure, and does not constitute a limitation on the technical solutions according to the embodiments of the present disclosure. Those of ordinary skill in the art may know that with emergence of new application scenarios, the technical solutions according to the embodiments of the present disclosure are also applicable to similar technical problems. In the description of the present disclosure, "plurality" means two or more than two, unless otherwise specified.

At present, peripherals such as a Camera and a LCD in display devices perform data processing through a CPU and a GPU on a motherboard to achieve LCD display, taking pictures by the Camera, and other functions. Since the display devices are all connected with the LCD and the Camera on the motherboard, image processing of the LCD and the Camera are completed by the CPU and the GPU on the motherboard, and communication between the LCD and the Camera depends on the CPU and the GPU on the motherboard for processing and forwarding. Before an image captured by the Camera is transmitted to the LCD, it is necessary to establish a plurality of handshake communication connections, and these handshake communication connections are run in serial, that is, it is necessary to verify each piece of identification information of a device sequentially in a certain order to ensure establishment of a communication link between the LCD and the Camera. In a process of image processing, it is necessary to perform different processing on an acquired image from a top layer to a bottom layer according to communication protocols corresponding to the CPU and the GPU on the motherboard, which not only increases power consumption of the motherboard and reduces service life of a display device, but also has relatively complicated hardware architecture and data communication. In order to simplify communication between a LCD and a Camera, in which a motherboard needs to be relied on for forwarding, an embodiment of the present disclosure provides an extremely simplified communication method based on Identity (ID) code information, which not only can directly establish a communication connection between the LCD and the Camera through a communication module, but also may send configuration information required for image display to a display device through the ID code information to control the display device to display, and send the ID code information directly to the other party for image processing, thereby achieving mutual control between the LCD and the Camera. The camera and the display in the embodiment may be of a same display device or of different display devices, which is not excessively limited in the embodiment.

A core idea of this example is that ID code information obtained by coding configuration information determined after image processing is directly sent to an opposite end through a communication module (i.e., a camera sends the ID code information to a display or the display sends the ID code information to the camera), so that the opposite end performs image processing on an image by using the received ID code information without a need for a mainboard to establish a communication connection between the camera and the display, receives the image of the camera, processes the image to obtain image information of the image, and then sends the image information to the display for display, thus eliminating an operation of using the mainboard for image processing and forwarding and effectively reducing power consumption of the mainboard. However, in the embodiment, since a camera and a display may establish direct communication, and e configuration information obtained after image processing and identification information are ID-coded together and then sent to the display, a processing flow is simple and convenient, which can greatly reduce processing time from shooting to display; since a CPU and a GPU on a motherboard are not used in this process, power consumption of the motherboard can be effectively reduced. Moreover, at present, communication between the display and the camera needs to be completed by the mainboard, and display configuration information of the display is fixed after the mainboard is connected with the display. Even if configuration information of an image captured by the camera, such as a resolution, changes, corresponding adjustment cannot be achieved by controlling the display through the camera, however, in the embodiment, based on ID code information, configuration information obtained by a camera end may be sent to the display through the ID code information. If a resolution in the ID code information changes, the display may display according to a changed resolution, thus achieving mutual control between the camera and the display. Among them, a principle of controlling the camera by the display is similar and will not be repeated here. The embodiment is mainly applied to communication between different peripherals of the display device, especially involving transmission of image data between the camera and the display, and mutual control between the camera and the display can be achieved by using the ID code information. It should be noted that the peripherals in the present disclosure, i.e., the camera and the display, are only an example, and a design principle of the present disclosure is to utilize ID code information to transmit image data after image processing, thereby simplifying communication between peripherals of the display device, as long as a way of direct communication between other peripherals based on this design principle belongs to the protection scope of the present disclosure.

As shown in FIG. 1, an embodiment of the present disclosure provides an inter-device communication system, including at least one camera 100 and at least one display 101. In some examples, it may be communication between one camera and a plurality of displays, communication between a plurality of cameras and one display, or communication between one camera and one display, which may be determined according to actual requirements, which is not excessively limited in the embodiment.

Figure 2:
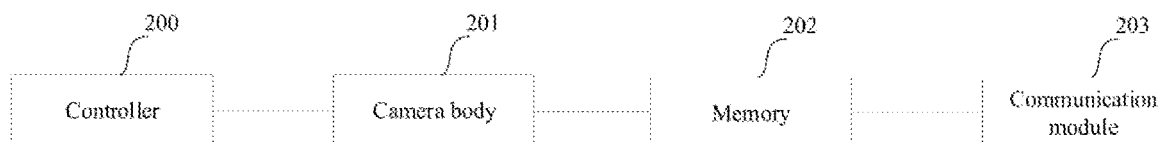
FIG. 2 is a schematic diagram of a camera according to an embodiment of the present disclosure.

In some examples, as shown in FIG. 2, the camera in the embodiment specifically includes a controller 200, a camera body 201, a memory 202, and a communication module 203.

The controller 200 is configured to perform image processing on an image, determine ID code information, and control sending and receiving of the image and the ID code information. The camera body 201 is configured to perform acquisition of an image; wherein the camera body 201 includes, but is not limited to, elements such as an image sensor and a camera lens.

The memory 202 is configured to perform storing an image and ID code information; optionally, the memory is an Electrically Erasable Programmable Read Only Memory (E2PROM), and a unique camera identification code is stored in a fixed storage region of the E2PROM.

The communication module 203 is configured to perform establishing a communication connection with the display and perform communication.

Optionally, the memory 202 in the embodiment may be integrated into the communication module 203 to achieve storage and communication functions. The communication module 203 further contains modules such as a CPU and a Random Access Memory (RAM).

Figure 3:
FIG. 3 is a schematic diagram of a display according to an embodiment of the present disclosure.

In some examples, as shown in FIG. 3, the display in the embodiment includes a controller 300, a display panel 301, a memory 302, and a communication module 303.

The controller 300 is configured to perform image processing on an image, determine ID code information, and control sending and receiving of ID code information.

The display panel 301 is configured to perform displaying of an image.

The memory 302 is configured to perform storing an image and ID code information; optionally, the memory is an E2PROM, and a unique display identification code is stored in a fixed storage region of the E2PROM.

The communication module 303 is configured to perform establishing a communication connection with a camera and perform communication.

Optionally, the memory 302 in the embodiment may be integrated into the communication module 303 to achieve storage and communication functions.

Figure 4:
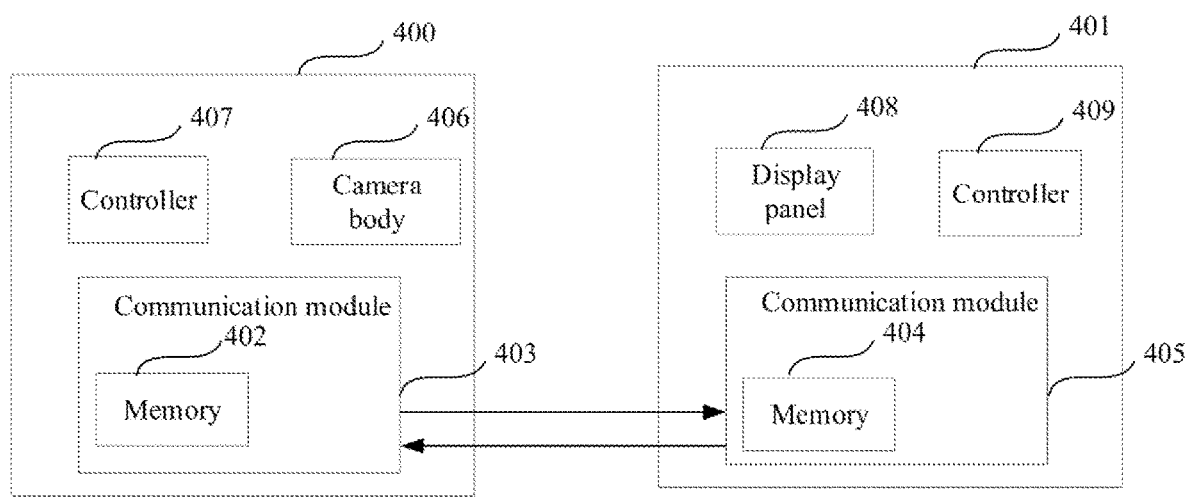
FIG. 4 is a schematic diagram of communication architecture between a camera and a display according to an embodiment of the present disclosure.

In some examples, as shown in FIG. 4, communication architecture between a camera 400 and a display 401 is provided in the embodiment, wherein a memory 402 is integrated into a communication module 403 and a memory 404 may be integrated into a communication module 405. A core working principle is that a camera acquires an image through a camera body 406, and a controller 407 processes an acquired image, generates ID code information and sends the image and the ID code information to the display 401 to control a display panel 408 of the display 401 to display the image. Similarly, after receiving a display operation, a controller 409 of the display 401 updates the ID code information and sends it to the camera to control the camera to update configuration information of the image, thus achieving mutual control between the camera 400 and the display 401. Among them, the communication module 403 and the communication module 405 may communicate via a base station or a mobile base station, which is not excessively limited in the embodiment.

Figure 5:
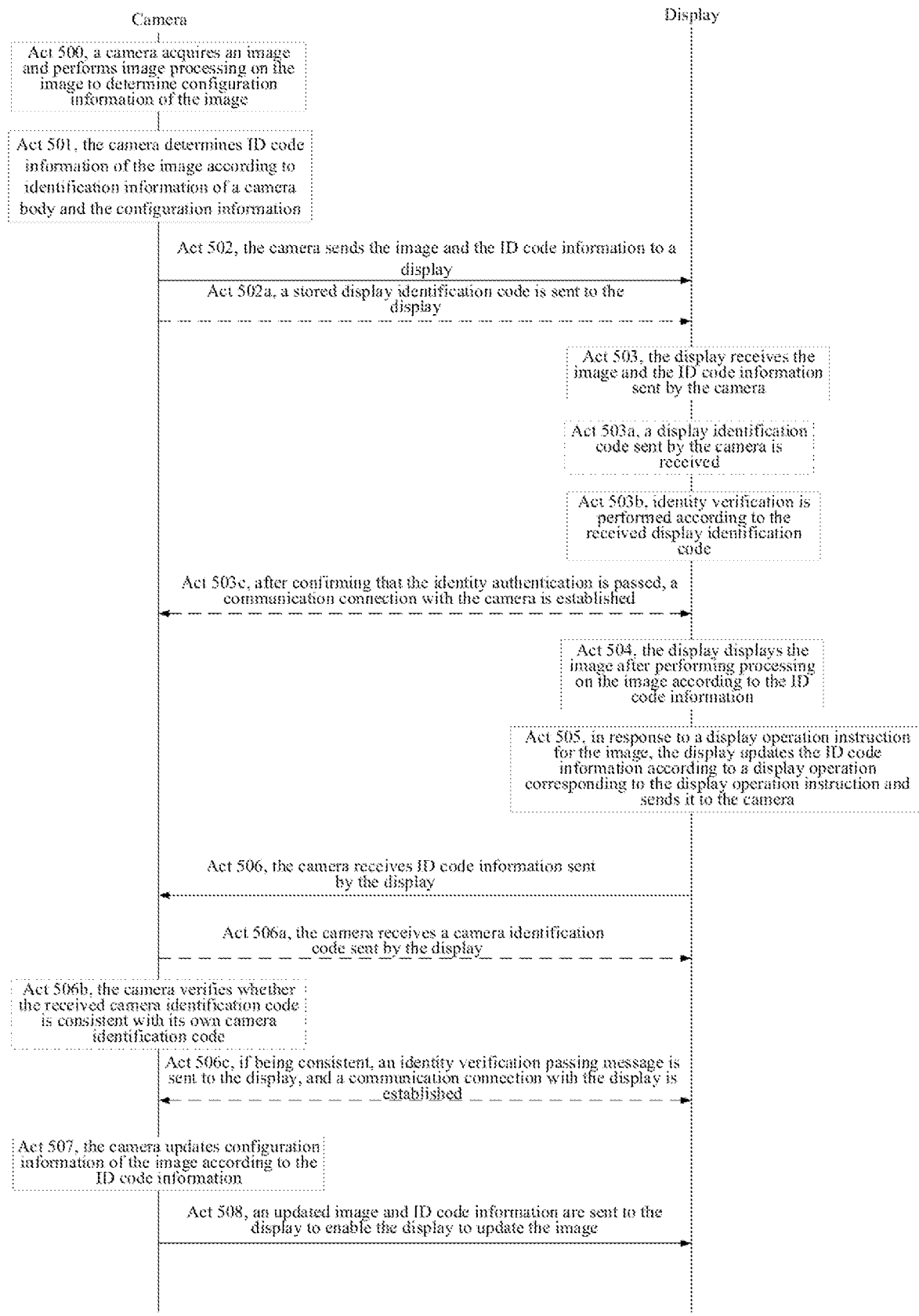
FIG. 5 is a flowchart of specific implementation of an inter-device communication method according to an embodiment of the present disclosure.

In some examples, as shown in FIG. 5, a specific implementation flow of an inter-device communication method based on a camera and a display in the above-described system of the embodiment is as follows.

Act 500, the camera acquires an image and performs image processing on the image to determine configuration information of the image.

Act 501, the camera determines ID code information of the image according to identification information of the camera body and the configuration information; wherein the ID code information is determined by using a controller of the camera.

Among them, the ID code information in the embodiment is used for representing the identification information of the camera body of the camera and the configuration information of the image; optionally, the identification information in the embodiment includes some or all of following information: a version number, a manufacturer identification ID, a Device ID; the configuration information in the embodiment includes some or all of following information: configuration function information, image change information, and image display information. Among them, the configuration function information is used for representing different modes of image processing, the image change information is used for configuration information in a corresponding mode, and the image display information is used for representing a display mode of an image, etc.

Figure 6:
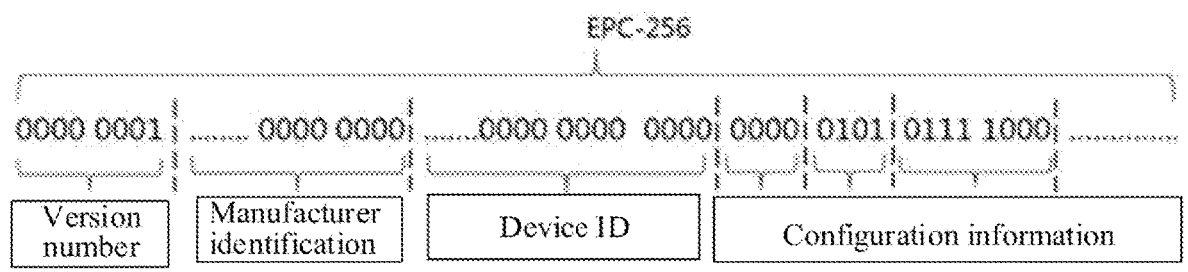
FIG. 6 is a schematic diagram of an EPC-256 coding example according to an embodiment of the present disclosure.

In some examples, since configuration information of an image needs to be transmitted through ID code information in the embodiment, a coding mode with relatively large coding capacity may be used, for example, through an Electronic Product Code (EPC) coding mode. A general structure of an EPC code is a binary bit string composed of several digital fields, including a version number, domain name management, object classification, and a serial number. A version of the EPC code includes 64-bit, 96-bit, and 256-bit data structures. Compared with other international coding technologies, the EPC code has sufficient coding capacity, and has strong compatibility and expandability. In the embodiment, a 256-bit I-type structure of an EPC code (i.e., an EPC-256-bit coding mode) may be selected, including an 8-bit version number, a 32-bit manufacturer identification code, a 56-bit object classification code, and a 160-bit serial number, wherein the manufacturer identification code is used for storing a manufacturer identification ID, the object classification code is used for storing a Device ID, and remaining 160 bits are used for storing configuration information, which can ensure that there is enough space in coding for timing configuration such as a resolution and a refresh rate. An example of EPC-256 coding in this example is shown in FIG. 6, including a version number, a manufacturer identification ID, a device Device ID, configuration function information, image change information, and image display information, and so on.

Act 502, the camera sends the image and the ID code information to the display.

Optionally, act 502a, a stored display identification code is sent to the display; wherein this act may be implemented simultaneously with or prior to the act 502 to ensure a communication connection is established with the display that has passed identity verification and transmission of image data is performed, which is not excessively limited in the embodiment.

In some examples, sending of the display identification code may be that the display identification code is carried each time the camera sends an image and ID code information, or, the display identification code is carried only when the camera sends an image and ID code information for a first time, which is not excessively limited in the embodiment.

In implementation, after the camera establishes a bonding relationship with at least one display in advance, a display identification code of the at least one display is stored, and the camera selects one stored display identification code and sends it to the display to enable the display to perform identity verification.

In some examples, one display identification code corresponding to a designated instruction of a user may be selected for transmission from the stored at least one display identification code based on the designated instruction of the user to the display; or, display identification codes are selected one by one according to a preset sequence and sent to the display until the display passes identity verification.

Act 503, the display receives the image and ID code information sent by the camera.

Optionally, act 503a, the display identification code sent by the camera is received.

Act 503b, identity verification is performed according to the received display identification code.

Act 503c, after confirming that the identity authentication is passed, a communication connection with the camera is established.

In implementation, the above acts 503a-503c may be implemented simultaneously with or prior to the act 503 to ensure that identity verification is performed and confirmed to be passed before the image is displayed, which is not excessively limited by the embodiment.

Act 504, the display displays the image after performs processing on the image according to the ID code information.

In the embodiment, the display performs corresponding processing on an image according to configuration information of the image contained in the ID code information, and displays a processed image.

In some examples, an embodiment also provides a bonding mode of a camera and a display. A principle is that a correspondence between identification codes is established at an opposite end respectively through unique identification codes of the camera and the display, so that the camera and the display are bonded, specifically as follows.

Act 1, the camera acquires a display identification code of the display.

In implementation, the display identification code is used for representing uniqueness of the display, including but not limited to, a Radio Frequency Identification (RFID) tag, a two-dimensional code, and the like. The camera may acquire the display identification code through scanning, and may also receive the display identification code sent by the display, which is not excessively limited in the embodiment.

Act 2, the camera establishes a correspondence between the display identification code and a camera identification code.

In the implementation, the camera stores the acquired display identification code and establishes a correspondence between it and the camera identification code. Among them, the camera identification code is used for representing uniqueness of the camera, including but not limited to, a Radio Frequency Identification (RFID) tag, a two-dimensional code, etc.

Act 3, the camera sends the camera identification code to the display.

Act 4, the display establishes a correspondence between the display identification code and the camera identification code.

In some examples, after a bonding relationship between the camera and the display is established according to the above acts, the display may call the camera by using the camera identification code, that is, after the display sends the camera identification code to the camera, the camera performs identity verification, feeds back a verification passing message to the display after passing the identity verification, and establishes a communication connection, so that the display sends ID code information to the camera. In implementation, in a method of calling a camera by a display, a camera corresponding to a touch signal instruction may be triggered by responding to the touch signal instruction at a preset position on a display screen of the display. For example, after the display is bonded with a plurality of cameras, numbers of the plurality of cameras are displayed at preset positions of the display, and a user may click on a plurality of displayed numbers to send a touch signal instruction. When the display receives the touch signal instruction, switching of a camera is triggered, that is, the display sends a camera identification code of the camera to the display to establish a communication connection between the camera and the display. Similarly, switching of a display is triggered by using a same method, wherein a touch signal signaling sent by a user received by the camera may be received through a display screen, or received through a motherboard, or received by itself, which is not excessively limited in the embodiment.

Act 505, in response to a display operation instruction for the image, the display updates the ID code information according to a display operation corresponding to the display operation instruction and sends it to the camera.

Figure 7:
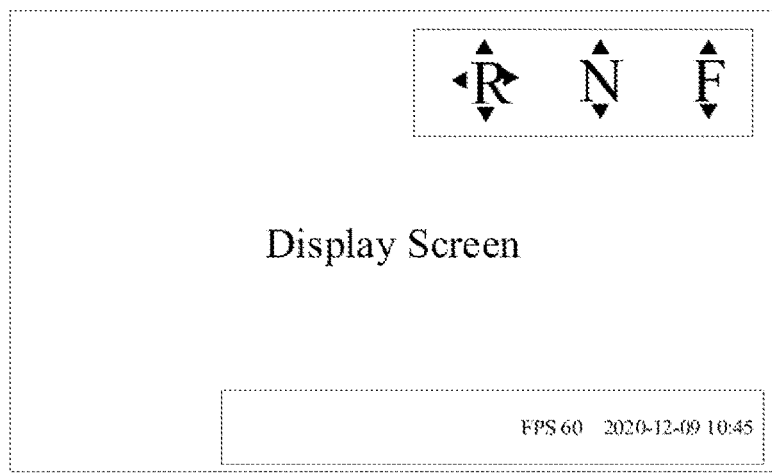
FIG. 7 is a schematic diagram of a display mode of configuration information according to an embodiment of the present disclosure.

In some examples, the display operation instruction includes, but is not limited to, switching display modes of an image or specific display configuration information in a certain display mode or the like. Among them, The display modes include, but are not limited to: a rotation angle of image display, whether to display an image according to a night vision mode, whether to perform frame rate switching display, a frame rate of a displayed image, brightness of the displayed image, a refresh rate of the displayed image, a resolution of the displayed image, etc. In implementation, as shown in FIG. 7, the above display modes may be displayed in a fixed region of a display screen of the display, and switching between different display modes may be triggered by means of clicking. Among them, a display mode may be determined through configuration function information in ID code information. For example, the configuration function information occupies 4 bits in the ID code information, and 1000 indicates that a configuration function has changed. 0000 denotes R, that is, a rotation ID. In implementation, after a user clicks, display of a rotation disk is triggered, including selection of four rotation angles, and a difference between adjacent rotation angles is 90°, which may be configured in coding bits corresponding to image display information. 0001 denotes N, that is, a night vision ID, functions of single-clicking to turn on and double-clicking to turn off may be set. 0010 denotes F, that is, a frame rate switching ID, and four sets of fps values such as (30, 60, 90, 120) may be preset for switching. 0011 denotes that the camera controls a frame rate ID of the display, that is, the camera may adjust its own refresh rate according to different pictures captured, and at the same time, write the refresh rate into a corresponding position of ID code information, and feed it back to the display for corresponding display by carrying the refresh rate through the ID code information. 0100 denotes a brightness control ID. For example, a backlight brightness value Y is divided into five threshold points: 30, 80, 128, 190, and 255. An ambient light intensity is converted into brightness values by the camera's own photosensitive system and a brightness value of a high threshold point in a brightness range is sent to the display by means of being carried in the ID code information.

Act 506, the camera receives the ID code information sent by the display.

Act 506*a*, the camera receives a camera identification code sent by the display.

Act 506*b*, the camera verifies whether the received camera identification code is consistent with its own camera identification code.

Act 506*c*, if being consistent, an identity verification passing message is sent to the display, and a communication connection with the display is established.

Act 507, the camera updates configuration information of the image according to the ID code information.

Act 508, an updated image and ID code information are sent to the display to enable the display to update the image.

In some examples, not only the camera may control the display to perform corresponding display, but also the display may control the camera to update configuration information of an image, that is, the display instructs the camera to update the configuration information of the image according to ID code information by sending the ID code information to the camera. In the embodiment, when configuration information such as a refresh rate and a resolution of the image is changed, configuration information in the ID code information such as image change information is correspondingly changed, and a mode of achieving establishing a communication connection and mutual control between the display and the camera by sending the ID code information through touch control, does not require an AP processor to process a data sending instruction, which really simplifies communication architecture between a camera and a display of an existing display device.

Figure 8:
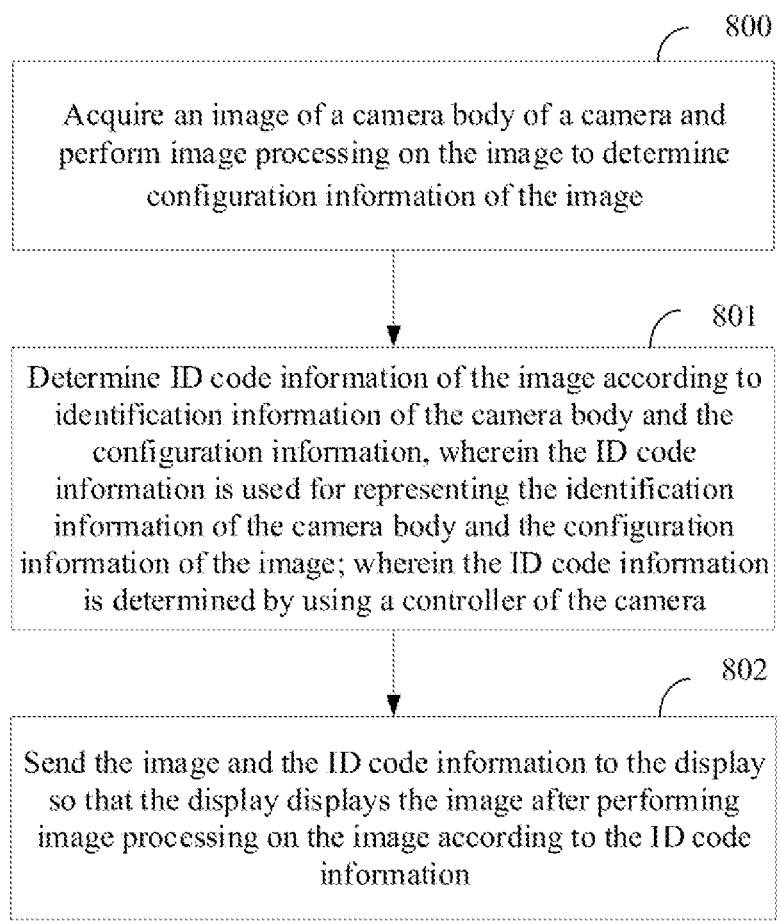
FIG. 8 is a flowchart of implementation of an inter-device communication method according to an embodiment of the present disclosure.

In some examples, an embodiment of the present disclosure also provides an inter-device communication method, which is applied to a camera. Since a principle of solving a problem the method is similar to that of the camera in the above system, please refer to the above embodiment for specific implementation content, which will not be repeated here. As shown in FIG. 8, an implementation flow of the method is as follows.

Act 800, acquiring an image of a camera body of a camera and performing image processing on the image to determine configuration information of the image.

Act 801, according to identification information of the camera body and the configuration information, determining ID code information of the image, wherein the ID code information is used for representing identification information of the camera body and the configuration information of the image; wherein the ID code information is determined using a controller of the camera.

Act 802, sending the image and the ID code information to a display so that the display displays the image after performing image processing on the image according to the ID code information.

In some examples, in the embodiment, the ID code information may also be updated, and a specific update mode is as follows: in response to an operation instruction for the image, updating the image and the ID code information of the image according to an image operation corresponding to the operation instruction; sending the updated image and ID code information to the display so that the display updates the image.

In some examples, in the embodiment, following acts may also be performed while the image and the ID code information are sent: sending a stored display identification code to the display, so that the display performs identity verification according to the received display identification code before displaying the image according to the ID code information, and establishes a communication connection with the camera after the identity verification is passed, wherein the display identification code is acquired from at least one display bonded with the camera.

In some examples, in the embodiment, it may be determined that the camera is bonded with the display in a following way: acquiring a display identification code of the display, and establishing a correspondence between the display identification code and a camera identification code of the camera to bond the display; and sending the camera identification code to the display so that the display establishes a correspondence between the display identification code and the camera identification code.

In some examples, in the embodiment, if there is a situation that the camera is bonded with a plurality of displays, that is, the camera stores a plurality of display identification codes, wherein the camera identification code and each display identification code are uniquely corresponding, a display identification code is selected for transmission in a following way: in response to a designated signaling for the display, sending a stored display identification code of the display corresponding to the designated signaling to the display. That is, by specifying a display by a user, the display specified by the user is selected and an identification code of the display is sent.

In some examples, in the embodiment, the configuration information of the image may also be updated according to the received ID code information sent by the display to achieve a function of controlling the camera by the display. Specific implementation acts are as follows: receiving the ID code information sent by the display; and updating the configuration information of the image according to the ID code information.

In some examples, while the camera receives the ID code information sent by the display, it may also perform a following flow: receiving a camera identification code sent by the display; and before updating the configuration information of the image according to the ID code information, verifying whether the received camera identification code is consistent with its own camera identification code, and if so, sending an identity verification passing message to the display, and establishing a communication connection with the display.

In some examples, in the embodiment, the ID code information may also be determined in a following way: coding the identification information and the configuration information through an Electronic Product Code (EPC) coding mode to obtain the ID code information.

In some examples, the identification information in the embodiment includes at least one of a version number, a manufacturer identification ID, and a device Device ID; and/or, the configuration information in the embodiment includes at least one of configuration function information, image change information, and image display information.

Figure 9:
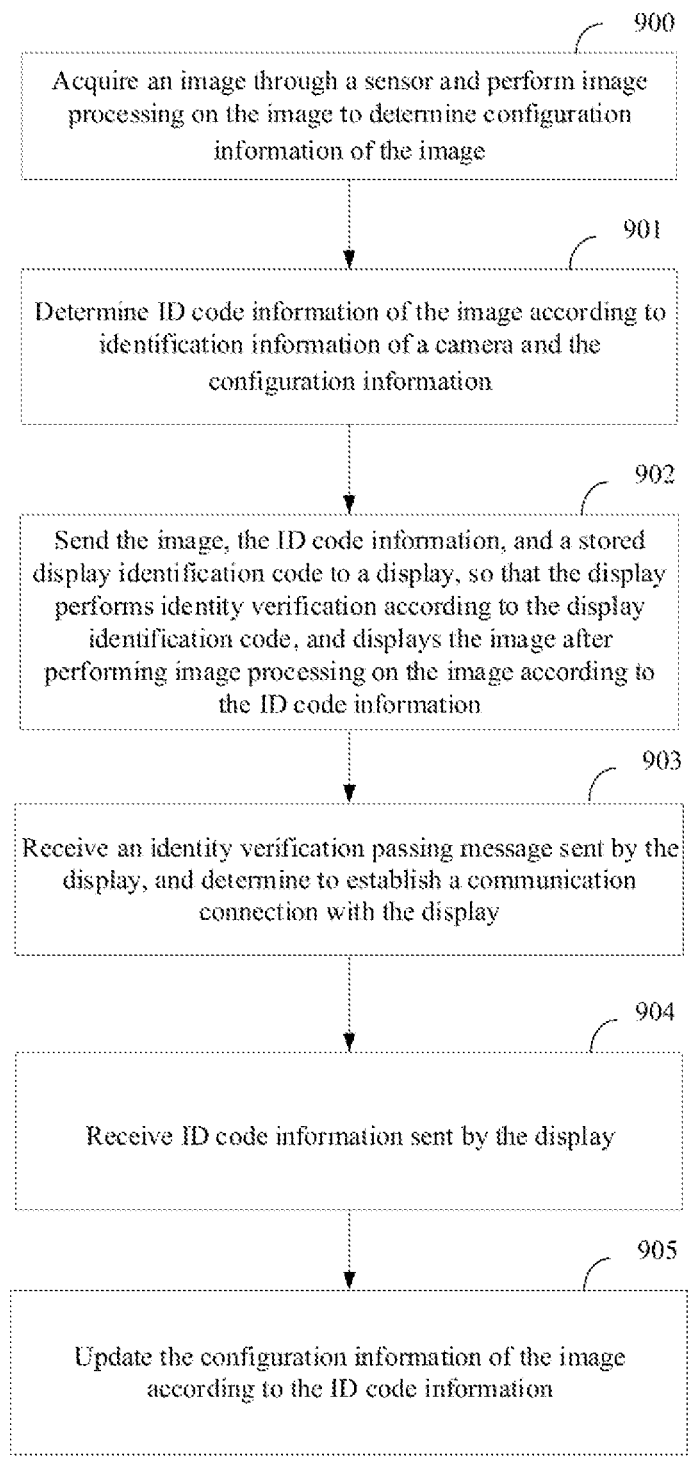
FIG. 9 is a flowchart of implementation of a mutual control method of a camera and a display according to an embodiment of the present disclosure.

In some examples, as shown in FIG. 9, an embodiment also provides a mutual control method between a camera and a display, and a specific implementation flow of the method is as follows.

Act 900, acquiring an image through a sensor and performing image processing on the image to determine configuration information of the image.

Act 901, determining ID code information of the image according to identification information of the camera and the configuration information.

Herein, the ID code information is used for representing the identification information of the camera and the configuration information of the image; specifically, it may be determined by using a controller of the camera.

Act 902, sending the image, the ID code information, and a stored display identification code to the display, so that the display performs identity verification according to the display identification code and displays the image after performs image processing on the image according to the ID code information.

Act 903, receiving an identity verification passing message sent by the display, and determining to establish a communication connection with the display.

Act 904, receiving the ID code information sent by the display.

Act 905, updating the configuration information of the image according to the ID code information.

Figure 10:
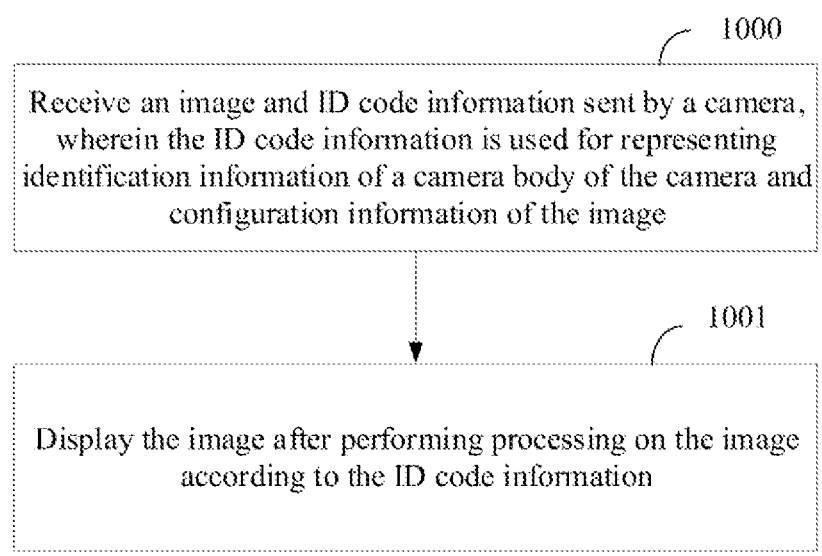
FIG. 10 is a flowchart of implementation of an inter-device communication method according to an embodiment of the present disclosure.

In some examples, an embodiment of the present disclosure also provides an inter-device communication method, which is applied to a display. Since a principle of solving a problem of the method is similar to that of the display in the above-mentioned system, please refer to the above-mentioned embodiment for specific implementation content, which will not be repeated here. As shown in FIG. 10, an implementation flow of the method is as follows.

Act 1000, receiving an image and ID code information sent by a camera, wherein the ID code information is used for representing identification information of a camera body of the camera and configuration information of the image.

Act 1001, displaying the image after performing processing on the image according to the ID code information.

In some examples, while receiving the image and the ID code information sent by the camera, the display is also configured to perform following acts.

1) Receiving a display identification code sent by the camera.
2) Performing identity verification according to the received display identification code before displaying the image according to the ID code information, and establishing a communication connection with the camera after it is determined that the identity verification is passed, wherein the display identification code is a display identification code in at least one display bonded with the camera.

In some examples, the display may determine that the display is bonded with the camera in a following way: receiving a camera identification code sent by the camera, and establishing a correspondence between the display identification code and the camera identification code to bond the camera.

In some examples, the display is also configured to update ID code information, and a specific update flow is as follows: in response to a display operation instruction for an image, updating the ID code information according to a display operation corresponding to the display operation instruction; and sending updated ID code information to the camera so that the camera updates the configuration information of the image according to the updated ID code information.

In some examples, while sending the ID code information to the camera, the display is also configured to perform a following act: sending a stored camera identification code to the camera, so that the camera performs identity verification according to the received camera identification code before updating the configuration information of the image and establishes a communication connection with the display after the identity verification is passed.

In some examples, if the display stores a plurality of camera identification codes, one of which is selected for transmission in a following way: in response to a designated signaling for the camera, sending a stored camera identification code of the camera corresponding to the designated signaling to the display.

In some examples, the display may determine the ID code information in a following way: coding the identification information and the configuration information through an Electronic Product Code (EPC) coding mode to obtain the ID code information.

In some examples, the identification information in the embodiment includes at least one of a version number, a manufacturer identification ID, and a device Device ID; and/or, the configuration information in the embodiment includes at least one of configuration function information, image change information, and image display information.

Figure 11:
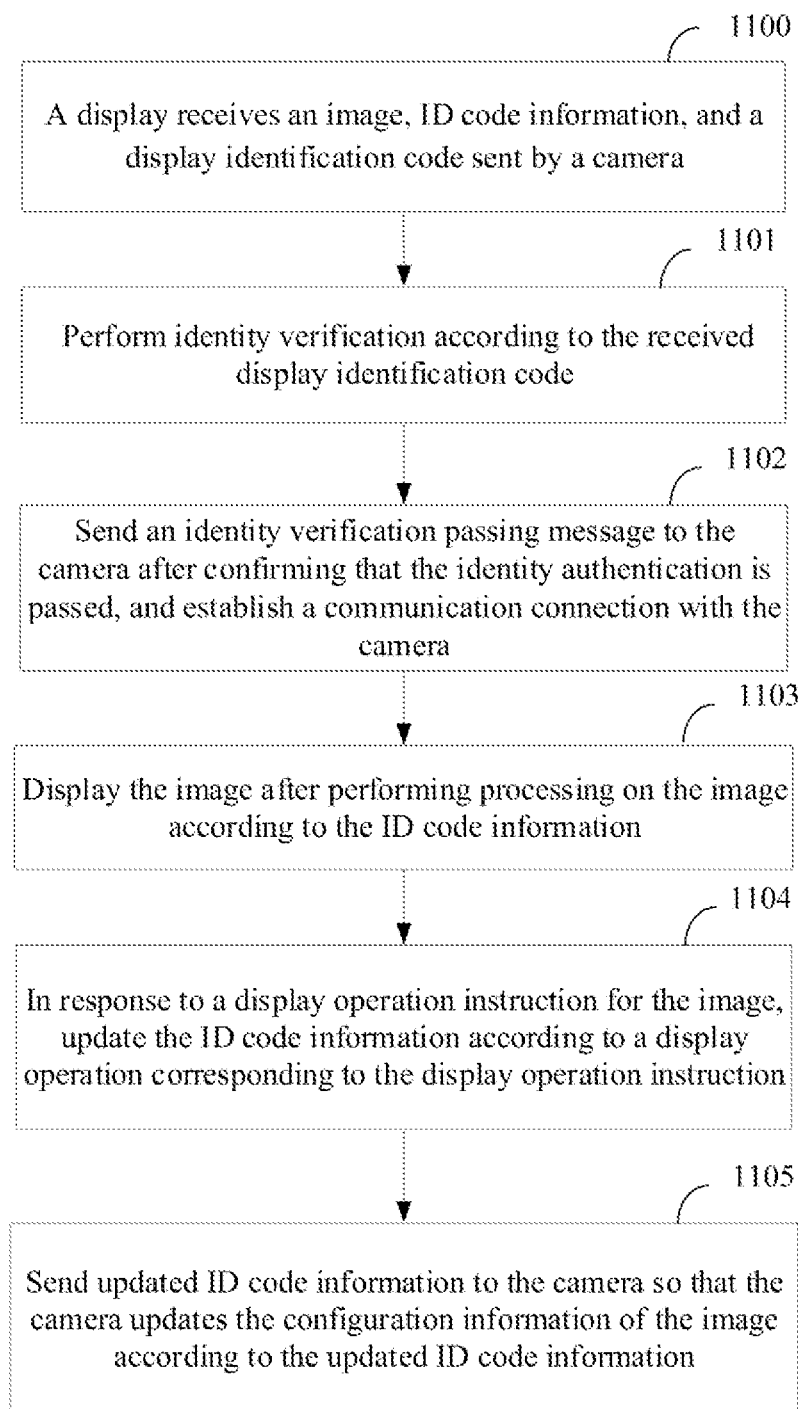
FIG. 11 is a flowchart of implementation of a mutual control method of a camera and a display according to an embodiment of the present disclosure.

In some examples, as shown in FIG. 11, an embodiment also provides a mutual control method between a camera and a display, and a specific implementation flow of the method is as follows.

Act 1100, the display receives an image, ID code information, and a display identification code sent by the camera.

Herein, the ID code information is used for representing identification information of the camera and configuration information of the image.

Act 1101, performing identity verification according to the received display identification code.

Act 1102, after confirming that the identity authentication is passed, sending an identity verification passing message to the camera, and establishing a communication connection with the camera.

Act 1103, displaying the image after performing processing on the image according to the ID code information.

Act 1104, in response to a display operation instruction for an image, updating the ID code information according to a display operation corresponding to the display operation instruction.

Act 1105, sending updated ID code information to the camera so that the camera updates the configuration information of the image according to the updated ID code information.

Based on a same inventive concept, an embodiment of the present disclosure also provides a camera. Since the camera is the camera in the method of the embodiment of the present disclosure, and a principle of solving a problem of the camera is similar to that of the method, implementation of the camera may be referred to implementation of the method, and repetition will not be repeated.

Figure 12:
FIG. 12 is a schematic diagram of a camera according to an embodiment of the present disclosure.

As shown in FIG. 12, the camera according to the embodiment includes a controller 1200, a camera body 1201, a memory 1202, and a communication module 1203.

Among them, the camera body 1201 is configured to perform acquisition of an image.

The memory 1202 is configured to perform storing the image and ID code information.

The communication module 1203 is configured to perform establishing a communication connection with a display and perform communication.

The controller 1200 is configured to perform following acts: acquiring an image from the camera body and performing image processing on the image to determine configuration information of the image; determining the ID code information of the image according to identification information of the camera body and the configuration information, wherein the ID code information is used for representing the identification information of the camera and the configuration information of the image; and sending the image and the ID code information to the display so that the display displays the image after performing image processing on the image according to the ID code information.

In some examples, the controller is specifically further configured to perform: in response to an operation instruction for the image, updating the image and the ID code information of the image according to an image operation corresponding to the operation instruction; and sending an updated image and ID code information to the display so that the display updates the image.

In some examples, the controller is specifically further configured to perform: sending a stored display identification code to the display, so that the display performs identity verification according to the received display identification code before displaying the image according to the ID code information, and establishes a communication connection with the camera after the identity verification is passed, wherein the display identification code is acquired from at least one display bonded with the camera.

In some examples, the controller is specifically configured to determine that the camera is bonded with the display in a following way: acquiring a display identification code of the display, and establishing a correspondence between the display identification code and a camera identification code of the camera to bond the display; and sending the camera identification code to the display, so that the display establishes a correspondence between the display identification code and the camera identification code.

In some examples, the controller is specifically configured to perform: in response to a designated signaling for the display, sending a stored display identification code of the display corresponding to the designated signaling to the display.

In some examples, the controller is specifically further configured to perform: receiving ID code information sent by the display; and updating configuration information of the image according to the ID code information.

In some examples, the controller is specifically further configured to perform: receiving a camera identification code sent by the display; and before updating the configuration information of the image according to the ID code information, verifying whether the received camera identification code is consistent with its own camera identification code, and if so, sending an identity verification passing message to the display, and establishing a communication connection with the display.

In some examples, the controller is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

Based on a same inventive concept, an embodiment of the present disclosure also provides a display. Since the display is the display in the method of the embodiment of the present disclosure, and a principle of solving a problem of the display is similar to that of the method, implementation of the display may be referred to implementation of the method, and repetition will not be repeated.

Figure 13:
FIG. 13 is a schematic diagram of a display according to an embodiment of the present disclosure.

As shown in FIG. 13, the display according to the embodiment includes a controller 1300, a display panel 1301, a memory 1302, and a communication module 1303.

Among them, the display panel 1301 is configured to perform displaying of an image.

The memory 1302 is configured to perform storing the image and ID code information.

The communication module 1303 is configured to perform establishing a communication connection with a camera and perform communication.

The controller 1300 is configured to perform following acts: receiving an image and ID code information sent by the camera, wherein the ID code information is used for representing identification information of a camera body of the camera and configuration information of the image; and displaying the image after performing processing on the image according to the ID code information.

In some examples, the controller is specifically further configured to perform: receiving a display identification code sent by the camera; and performing identity verification according to the received display identification code before displaying the image according to the ID code information, and establishing a communication connection with the camera after it is confirmed that the identity verification is passed, wherein the display identification code is a display identification code in at least one display bonded with the camera.

In some examples, the controller is specifically configured to determine that the display is bonded with the camera by: receiving a camera identification code sent by the camera, and establishing a correspondence between the display identification code and the camera identification code to bond the camera.

In some examples, the controller is specifically further configured to perform: in response to a display operation instruction for an image, updating the ID code information according to a display operation corresponding to the display operation instruction; and sending updated ID code information to the camera, so that the camera updates configuration information of the image according to the updated ID code information.

In some examples, the controller is specifically further configured to perform: sending a stored camera identification code to the camera, so that the camera performs identity verification according to the received camera identification code before updating the configuration information of the image, and establishes a communication connection with the display after the identity verification is passed.

In some examples, the controller is specifically configured to perform: in response to a designated signaling for the camera, sending a stored camera identification code of the camera corresponding to the designated signaling to the display.

In some examples, the controller is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

Based on a same inventive concept, an embodiment of the present disclosure also provides an inter-device communication apparatus. Since the apparatus is the apparatus in the method of the embodiment of the present disclosure, and a principle of solving a problem of the apparatus is similar to that of the method, implementation of the apparatus may be referred to implementation of the method, and repetition will not be repeated.

Figure 14:
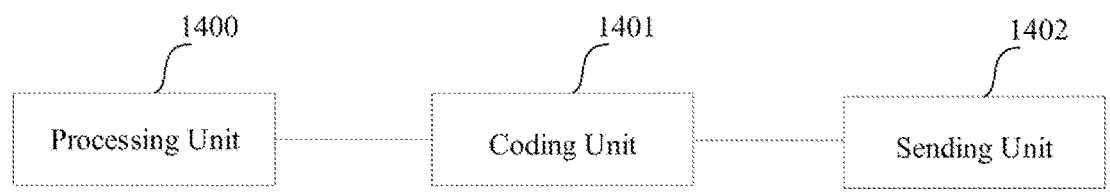
FIG. 14 is a schematic diagram of an inter-device communication apparatus according to an embodiment of the present disclosure.

As shown in FIG. 14, the apparatus includes: a processing unit 1400 configured to acquire an image and perform image processing on the image to determine configuration information of the image; a coding unit 1401 configured to determine ID code information of the image according to identification information of a camera body and the configuration information, wherein the ID code information is used for representing the identification information of the camera body and the configuration information of the image; and a sending unit 1402 configured to send the image and the ID code information to the display so that the display displays the image after performing image processing on the image according to the ID code information.

In some examples, the apparatus further includes an updating unit configured to: in response to an operation instruction for the image, update the image and ID code information of the image according to an image operation corresponding to the operation instruction; and send an updated image and ID code information to the display so that the display updates the image.

In some examples, the sending unit is specifically further configured to: send a stored display identification code to the display, so that the display performs identity verification according to the received display identification code before displaying the image according to the ID code information, and establishes a communication connection with the camera after the identity verification is passed, wherein the display identification code is acquired from at least one display bonded with the camera.

In some examples, the sending unit is specifically configured to determine that the camera is bonded with the display in a following way: acquiring a display identification code of the display, and establishing a correspondence between the display identification code and a camera identification code of the camera to bond the display; and sending the camera identification code to the display, so that the display establishes a correspondence between the display identification code and the camera identification code.

In some examples, the sending unit is specifically configured to: in response to a designated signaling for the display, send a stored display identification code of the display corresponding to the designated signaling to the display.

In some examples, the apparatus further includes a receiving and updating unit, specifically configured to: receive ID code information sent by the display; and update configuration information of the image according to the ID code information.

In some examples, the receiving and updating unit is specifically further configured to: receive a camera identification code sent by the display; and before updating the configuration information of the image according to the ID code information, verify whether the received camera identification code is consistent with its own camera identification code, and if so, send an identity verification passing message to the display, and establish a communication connection with the display.

In some examples, the coding unit is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

Based on a same inventive concept, an embodiment of the present disclosure also provides an inter-device communication apparatus. Since the apparatus is the apparatus in the method of the embodiment of the present disclosure, and a principle of solving a problem of the apparatus is similar to that of the method, implementation of the apparatus may be referred to implementation of the method, and repetition will not be repeated.

Figure 15:
FIG. 15 is a schematic diagram of an inter-device communication apparatus according to an embodiment of the present disclosure.

As shown in FIG. 15, the apparatus includes: a receiving unit 1500 configured to receive an image and ID code information sent by a camera, wherein the ID code information is used for representing identification information of a camera body of the camera and configuration information of the image; and a display unit 1501 configured to display the image after performing processing on the image according to the ID code information.

In some examples, the receiving unit is further configured to: receive a display identification code sent by the camera; and perform identity verification according to the received display identification code before displaying the image according to the ID code information, and establish a communication connection with the camera after it is confirmed that the identity verification is passed, wherein the display identification code is a display identification code in at least one display bonded with the camera.

In some examples, the receiving unit is specifically configured to determine that the display is bonded with the camera by: receiving a camera identification code sent by the camera, and establishing a correspondence between the display identification code and the camera identification code to bond the camera.

In some examples, the apparatus further includes an updating and sending unit, specifically configured to: in response to a display operation instruction for an image, update the ID code information according to a display operation corresponding to the display operation instruction; and send updated ID code information to the camera so that the camera updates configuration information of the image according to the updated ID code information.

In some examples, the updating and sending unit is specifically further configured to: send a stored camera identification code to the camera, so that the camera performs identity verification according to the received camera identification code before updating the configuration information of the image, and establishes a communication connection with the display after the identity verification is passed.

In some examples, the sending unit is specifically configured to: in response to a designated signaling for the camera, send a stored camera identification code of the camera corresponding to the designated signaling to the display.

In some examples, the updating and sending unit is specifically configured to determine the ID code information by: coding the identification information and the configuration information through an Electronic Product Code (EPC) coding mode to obtain the ID code information.

In some examples, the identification information includes at least one of a version number, a manufacturer identification ID, and a device Device ID; and/or, the configuration information includes at least one of configuration function information, image change information, and image display information.

Based on a same inventive concept, an embodiment of the present disclosure also provides a computer storage medium on which a computer program is stored, wherein when the program is executed by a processor, following acts are implemented: acquiring an image from a camera body of a camera and performing image processing on the image to determine configuration information of the image; determining ID code information of the image according to the identification information of the camera body and the configuration information, wherein the ID code information is used for representing the identification information of the camera and the configuration information of the image; and sending the image and the ID code information to the display so that the display displays the image after performing image processing on the image according to the ID code information.

Based on a same inventive concept, an embodiment of the present disclosure also provides a computer storage medium on which a computer program is stored, wherein when the program is executed by a processor, following acts are implemented: receiving an image and ID code information sent by a camera, wherein the ID code information is used for representing identification information of a camera body of the camera and configuration information of the image; and displaying the image after performing processing on the image according to the ID code information.

It should be understood by those skilled in the art that the embodiments of the present disclosure may be provided as methods, systems, or computer program products. Therefore, for the present disclosure a form of an entire hardware embodiment, an entire software embodiment, or an embodiment combining software and hardware aspects may be adopted. Furthermore, for the present disclosure, a form of a computer program product implemented on one or more computer usable memory media (including but not limited to a magnetic disk memory, a Compact Disc Read Only Memory (CD-ROM), and an optical memory, etc.) containing computer usable program codes therein may be adopted.

The present disclosure is described with reference to flowcharts and/or block diagrams of methods, devices (systems), and computer program products according to the embodiments of the present disclosure. It should be understood that each flow and/or block in the flowcharts and/or block diagrams, as well as combinations of flows and/or blocks in the flowcharts and/or block diagrams, may be implemented by computer program instructions. These computer program instructions may be provided to a general purpose computer, a special purpose computer, an embedded processor, or a processor of another programmable data processing device, so that an apparatus configured to implement functions specified in one or more flows of the flowcharts and/or one or more blocks of the block diagrams through instructions executed by a computer or a processor of another programmable data processing device is generated.

These computer program instructions may also be stored in a computer-readable memory capable of directing a computer or another programmable data processing device to operate in a specific manner such that the instructions stored in the computer-readable memory produce an article of manufacture including an instruction apparatus, and the instruction apparatus implements functions specified in one or more flows of the flowcharts and/or one or more blocks of the block diagrams.

These computer program instructions may also be loaded onto a computer or another programmable data processing device such that a series of operational acts are executed on the computer or another programmable device to produce computer-implemented processing, such that the instructions executed on the computer or another programmable device provide acts for implementing functions specified in one or more flows of the flowcharts and/or one or more blocks of the block diagrams.

Although preferred embodiments of the present disclosure have been described, those skilled in the art may make additional changes and modifications to these embodiments once underlying inventive concepts are known. Therefore, the appended claims are intended to be interpreted to encompass preferred embodiments as well as all changes and modifications falling within the scope of the present disclosure.

Apparently, various modifications and variations to the embodiments of the present disclosure may be made by those skilled in the art without departing from the spirit and scope of the embodiments of the present disclosure. Thus, if these modifications and variations to embodiments of the present disclosure are within the scope of the claims of the present disclosure and their equivalent techniques, the present disclosure is also intended to include these modifications and variations.

The invention claimed is:

1. A camera, comprising a controller, a camera body, a memory, and a transceiver, wherein:
    the camera body is configured to perform acquisition of an image;
    the memory is configured to perform storing the image and Identity (ID) code information;
    the transceiver is configured to perform establishing a communication connection with a display and perform communication;
    the controller is configured to perform following acts:
    acquiring an image from the camera body and performing image processing on the image to determine configuration information of the image;
    determining ID code information of the image according to identification information of the camera body and the configuration information, wherein the ID code information is used for representing the identification information of the camera body and the configuration information of the image;
    sending the image and the ID code information to the display to enable the display to display the image after performing image processing on the image according to the ID code information;
    in response to an operation instruction for the image, updating the image and the ID code information of the image according to an image operation corresponding to the operation instruction; and
    sending an updated image and ID code information to the display to enable the display to update the image.

2. The camera according to claim 1, wherein the controller is further configured to perform:
    sending a stored display identification code to the display, to enable the display to perform identity verification according to the received display identification code before displaying the image according to the ID code information, and establish a communication connection with the camera after the identity verification is passed, wherein the display identification code is acquired from at least one display bonded with the camera.

3. The camera according to claim 2, wherein the controller is configured to determine that the camera is bonded with the display by:
    acquiring a display identification code of the display, and establishing a correspondence between the display identification code and a camera identification code of the camera to bond the display; and
    sending the camera identification code to the display to enable the display to establish a correspondence between the display identification code and the camera identification code.

4. The camera according to claim 2, wherein the controller is configured to perform:
    in response to a designated signaling for the display, sending a stored display identification code of the display corresponding to the designated signaling to the display.

5. The camera according to claim 1, wherein the controller is further configured to perform:
    receiving ID code information sent by the display; and
    updating the configuration information of the image according to the ID code information.

6. The camera according to claim 5, wherein the controller is further configured to perform:
    receiving a camera identification code sent by the display;
    before updating the configuration information of the image according to the ID code information, verifying whether the received camera identification code is consistent with its own camera identification code, and if so, sending an identity verification passing message to the display, and establishing a communication connection with the display.

7. The camera according to claim 1, wherein the controller is further configured to determine the ID code information by:
    coding the identification information and the configuration information through an Electronic Product Code (EPC) coding mode to obtain the ID code information.

8. The camera according to claim 1, wherein the identification information comprises at least one of a version number, a manufacturer identification ID, and a device Device ID; and/or,
the configuration information comprises some or all of at least one of configuration function information, image change information, and image display information.

9. A display, wherein the display comprises a controller, a display panel, a memory, and a transceiver, wherein:
the display panel is configured to perform displaying of an image;
the memory is configured to perform storing the image and ID code information;
the transceiver is configured to perform establishing a communication connection with a camera and perform communication;
the controller is configured to perform following acts:
receiving an image and ID code information sent by the camera, wherein the ID code information is used for representing identification information of a camera body of the camera and configuration information of the image;
displaying the image after performing processing on the image according to the ID code information;
in response to a display operation instruction for an image, updating the ID code information according to a display operation corresponding to the display operation instruction; and
sending updated ID code information to the camera to enable the camera to update the configuration information of the image according to the updated ID code information.

10. The display according to claim 9, wherein the controller is specifically configured to perform:
receiving a display identification code sent by the camera;
performing identity verification according to the received display identification code before displaying the image according to the ID code information, and establishing a communication connection with the camera after it is confirmed that the identity verification is passed, wherein the display identification code is a display identification code in at least one display bonded with the camera.

11. The display according to claim 10, wherein the controller is specifically configured to determine that the display is bonded with the camera by:
receiving a camera identification code sent by the camera, and establishing a correspondence between the display identification code and the camera identification code to bond the camera.

12. The display according to claim 9, wherein the controller is specifically further configured to perform:
sending a stored camera identification code to the camera, to enable the camera to perform identity verification according to the received camera identification code before updating the configuration information of the image, and establish a communication connection with the display after the identity verification is passed.

13. The display according to claim 12, wherein the controller is specifically configured to perform:
in response to a designated signaling for the camera, sending a stored camera identification code of the camera corresponding to the designated signaling to the display.

14. The display according to claim 9, wherein the controller is specifically configured to determine the ID code information by:
coding the identification information and the configuration information through an Electronic Product Code (EPC) coding mode to obtain the ID code information.

15. The display according to claim 9, wherein the identification information comprises at least one of a version number, a manufacturer identification ID, and a device Device ID; and/or,
the configuration information comprises at least one of configuration function information, image change information, and image display information.

16. An inter-device communication method, which is applied to a camera, wherein the method comprises:
acquiring an image from a camera body of the camera and performing image processing on the image to determine configuration information of the image;
determining Identity (ID) code information of the image by using a controller of the camera according to identification information of the camera body and the configuration information, wherein the ID code information is used for representing the identification information of the camera body and the configuration information of the image;
sending the image and the ID code information to the display to enable the display to display the image after performing image processing on the image according to the ID code information;
in response to an operation instruction for the image, updating the image and the ID code information of the image according to an image operation corresponding to the operation instruction; and
sending an updated image and ID code information to the display to enable the display to update the image.

17. An inter-device communication method, which is applied to a display according to claim 9, wherein the method comprises:
receiving an image and Identity (ID) code information sent by a camera, wherein the ID code information is used for representing identification information of a camera body of the camera and configuration information of the image; and
displaying the image after performing processing on the image according to the ID code information by using a controller of the display.

18. A non-transitory computer-readable storage medium on which a computer program is stored, wherein when the program is executed by a processor, the method according to claim 16 are implemented.

* * * * *